(No Model.)

C. W. SALADEE.
SPRING GEAR FOR VEHICLES.

No. 355,341. Patented Jan. 4, 1887.

Attest:
Court A. Cooper,
A. E. Hansmann.

C. W. Saladee
Inventor.

(No Model.) 2 Sheets—Sheet 2.

C. W. SALADEE.
SPRING GEAR FOR VEHICLES.

No. 355,341. Patented Jan. 4, 1887.

Attest:
Court A. Cooper
A. E. Hansmann

C. W. Saladee
Inventor:
By Foster & Freeman
Attys.

UNITED STATES PATENT OFFICE.

CYRUS W. SALADEE, OF SHELTON, CONNECTICUT.

SPRING-GEAR FOR VEHICLES.

SPECIFICATION forming part of Letters Patent No. 355,341, dated January 4, 1887.

Application filed December 11, 1885. Serial No. 185,413. (No model.)

*To all whom it may concern:*

Be it known that I, CYRUS W. SALADEE, a citizen of the United States, and a resident of Shelton, in the county of Fairfield and State of Connecticut, have invented certain new and useful Improvements in Duplex Springs for Vehicles and their Attachments, of which the following is a specification.

This invention consists in the combination of a self-compensating spring with links or other adjustable bearings, and has for its object the prevention of that violent motion and friction which prematurely wears out the link attachments of other and ordinary forms of springs, and also to secure a softer motion than is had in springs not having this self-compensating character, and suspended from link-bearings in the usual way.

The invention relates, further, to certain details of construction.

Figure 1:
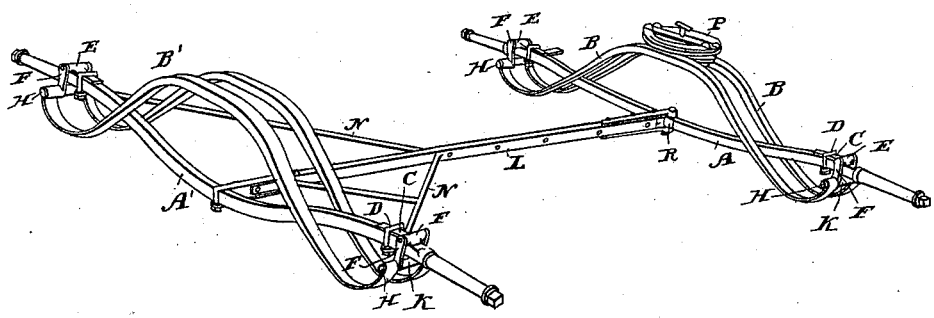
Figure 7:
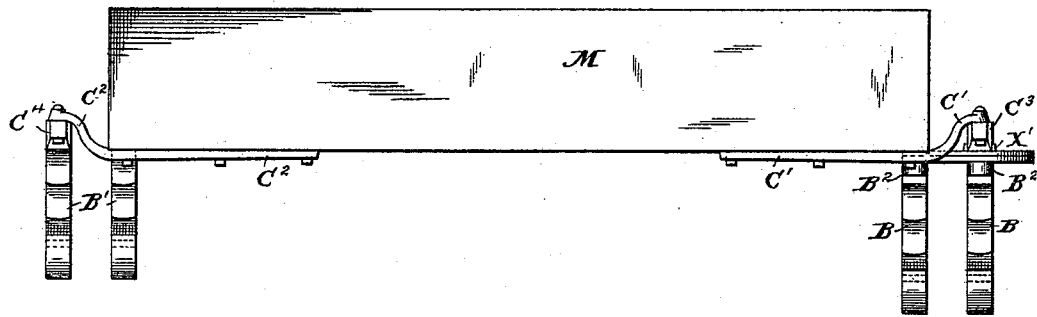
Figure 2:
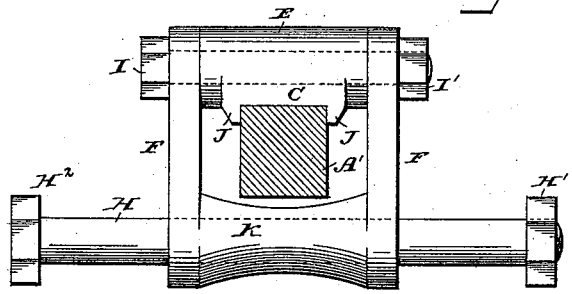
Figure 3:
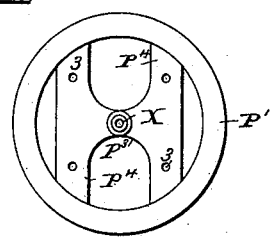
Figure 4:
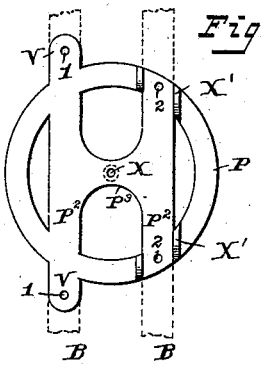
Figure 5:
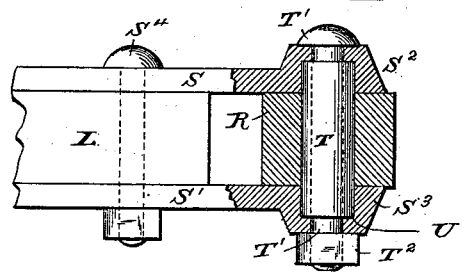
Figure 6:
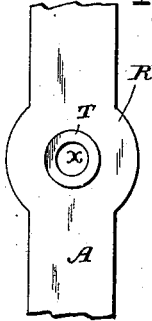

In the drawings, Figure 1 is a perspective rear view of the running-gear of a vehicle, omitting the wheels, body, and spring-bars. Fig. 2 is an enlarged detached end view, the axle in section, and having in position one of the oscillating spring-bearings with the springs removed from the trunnion-bolt. Fig. 3 is an enlarged detached view of the lower circle of the fifth-wheel, and Fig. 4 an inverted plan view of the upper circle of the fifth-wheel. Fig. 5 is an enlarged detached side elevation of the front end of the perch, and exposing the detailed construction of the coupling connecting the perch with the front axle. Fig. 6 is a plan view of the enlarged center portion of the front axle. Fig. 7 is a side elevation of a body, showing its mode of suspension upon the duplex springs at each end.

In carrying out my invention I employ the two axles A and A', neither of which has the usual "axle-bed" of wood overlying its top surface. The front axle has preferably a depression of, say, one and one-half inch, whereby to prevent the lower end of the king-bolt of the fifth-wheel from striking the head of the king-bolt of the axle-coupling below. As I desire to use a straight perch, I first ascertain the height of the wheels to be used, front and rear, and supposing they are to be three feet eight inches and four feet, there is a difference of two inches from the ground to the center of the hubs, front and rear. Now that the front axle has been depressed one and one-half inch, the center portion of the rear axle must (in order to carry the straight perch parallel with the ground) be depressed three and one-half inches. This done, the rear end of the perch is butted against the front face of the rear axle and there rigidly secured in the usual way. The perch is braced, in relation to the rear axle, by stays N, in any suitable way.

The front end of the perch is pivotally connected to the front axle as follows: The center portion of the axle is widened, as at R, Fig. 6, whereby to give requisite strength around a hole, $x$, that is made through its center to receive the hollow boss on tube T, (see Figs. 5 and 6,) which latter extends above and below the axle to form bosses, which are recessed with the heads $S^2$ $S^3$ in the ends of the perch-braces S and S', bolted to the perch by a bolt, $S^4$. A king-bolt, T', is next passed down through the heads $S^2$ and $S^3$ and tube T, the whole held together by the nut $T^2$.

The object of this part of my invention is to relieve the hole in the axle receiving the tube T from any wear of the bolt T', which otherwise would tend to wear and enlarge the hole, and thus weaken the axle; also, by the use of the hollow tube T, I take the strain off the bolt T' by inserting the projecting ends of the tube into the heads $S^2$ and $S^3$, as described. This tube will also serve as a safety-bolt in case the king-bolt T' should become fractured or fall out. A further object is to give as wide a bearing as possible between the top and bottom of the axle and the bearing-faces of the heads $S^2$ and $S^3$. A transversely-arranged duplex spring, consisting of two springs suspended from opposite sides of the axle, is employed, as clearly seen in Fig. 1. These springs B B are preferably of the self-compensating form, of the character substantially as shown and described in my Patent No. 305,850, or of other equivalent and well-known forms; but in place of suspending the terminal eyes of such springs to fixed and immovable bearings, I connect them, in this instance, to oscillating or adjustable bearings.

While it is true that the self-compensating form of spring described and shown in my said former patent acts as designed, there is yet a limit to their self-compensating character, and when they are depressed beyond this limit the fracture of the main plate of the spring will sometimes occur. On the other hand, there is this serious objection to the use of a link attachment to the ends of ordinary semi-elliptic springs in this, that, lacking the self-compensating form, their elongation and contraction when in motion under the body imparts to the link-bearings such a violent degree of frictional motion as to prematurely wear out their bearings, and in a very short time cause them to become loose and shaky; but by combining the self-compensating form of spring with a link or adjustable bearing, so little motion is imparted to the latter from the action of springs of this character that the wear upon them is so slight as scarcely ever to be perceptible.

I effect this novel combination of a self-compensating spring and links or adjustable bearings in this instance as follows: On top of the axle, near the shoulder, is secured the plate C, the outer end of which terminates in a head, E, through which passes the bolt I. The bearing side of this head has lips J, which closely fit both sides of the axle, whereby to prevent any lateral movement of the head. This plate C is held in position by a clip, D, or otherwise. Arms F F are suspended from the bolt I, (see Fig. 2,) and a distance sleeve or spool, K, is interposed, or preferably is made integral with the arms. Through this spool and the arms is passed the trunnion-bolt H, which enters the terminal eyes of the springs, as seen in Fig. 1. When preferred, I can make the arms F and spool or arm-piece and bolt H of one solid forging or armed yoke; but I prefer the construction shown in the drawings, for should the trunnion-bolt be broken it can be easily replaced by a new one.

It will be seen that the yokes or links hang below the axle, or that the bearings of the ends of the springs are below the bottom of the axle, whereby to tend to maintain the position of the axle and prevent its turning without the necessity of using braces or other means for the purpose.

P′ is the lower circle of the fifth-wheel. The truss-plate P⁴ P⁴ spans both springs, and is rigidly secured to the top center portion of the springs by bolts or clips 3 3 3 3. This truss-plate is preferably integral with the circle; yet it may be made separately and connected by bolts or rivets thereto. The top circle, P, is shown in Fig. 4, and in this instance is provided on its face with upwardly-projecting lips X′, and at its edge with laterally-projecting lips V. A truss-plate, P², is attached to or made integral with the circle P. The upper side of the lower truss and the under side of the upper one are centrally united by a male and female boss-bearing, in the usual way, and a king-bolt passing down through both will securely hold both circles together. The opposite ends of the body, if constructed as shown in Fig. 7, are secured directly over the inside springs of each pair, front and rear, and body-loops C′ and C² are extended from the opposite ends of the body to a spring-bar supported by the outside springs of each pair. By this extension of the body over the inside springs, as shown in Fig. 7, the gear may be made shorter than when the body is hung between the inside springs, as shown in my Patent No. 305,850, and, besides, a much better bearing is secured against the longitudinal thrust of the body than shown in said patent. The front end of the body is bolted to the projecting ears V V of the upper circle of the fifth-wheel at 1 1, and a spring-bar is carried at 2 2 between the lips X′, all as clearly seen in Figs. 4 and 7.

I do not claim, broadly, a spring curved downward from the center and upward at the ends and connected to links, this being old; but in all cases heretofore the curvature has been such that the vertical motion of the spring results in as great a vibration of the links as when ordinary semi-elliptic springs are used. I make the spring self-compensating—that is, of such downward and upward curves that no motion practically is imparted to the links when the spring plays vertically, the links swinging, therefore, only under the side motions of the body.

Without limiting myself to the precise arrangement and construction of parts shown, I claim—

1. In a vehicle, a body, axles therefor having their middles curved downward and provided at their ends with depending links, in combination with a perch that extends in the horizontal plane between and connects the middles of said axles, and springs having downwardly-curved middles and upwardly-curved ends connected to said links upon opposite sides of said axles, substantially as described.

2. Links consisting of side arms connected at their lower ends by sleeves or spools integral with said arms, in combination with plates C, having enlarged apertured heads interposed between the side arms of said links and provided with depending lugs to embrace an axle, said axle and springs arranged at opposite sides thereof and connected to said links, substantially as described.

3. In a vehicle, a body, axles therefor having downwardly-bent middles connected together by a horizontally-extending perch, in combination with depending links having side arms connected together below said axles by apertured sleeves or spools integral with said side arms, plates having enlarged apertured heads interposed between said side arms above the axles and provided with depending lugs to embrace said axles, and securing-clips and springs extending between said links upon opposite sides of said axles, substantially as described.

4. In a vehicle, the combination of an axle having an enlarged apertured middle, a tube extending therethrough and projecting at opposite sides thereof, with a perch, the connecting king-bolt, and springs arranged at opposite sides of said axle, and connected below said axle to links secured to and depending from the upper surface thereof, substantially as described.

5. In a vehicle, and in combination, an axle, plates secured upon said axle by clips and provided with enlarged apertured heads having downwardly-projecting lugs to embrace said axle, links having side arms connected together at their lower ends by a sleeve integral with said arms, said links pivoted to and depending from said plates and provided below the axle with laterally-projecting trunnions, and springs having downwardly-curved middles and upwardly-curved ends connected to said trunnions, substantially as described.

6. In a running-gear for vehicles, the herein-described coupling connecting the perch with the front axle, consisting of the enlarged center R of the axle, and the hollow spool T, passing vertically through the enlarged center R and projecting above and below the axle, in combination with the heads $S^2$ and $S^3$ of the perch-stays S and S', said spool being recessed into said heads, whereby to take the strain off of the king-bolt T', substantially as set forth.

7. The combination of the enlarged axle-center R, vertical spool T, heads $S^2$ and $S^3$, and king-bolt T', the whole constructed and arranged to operate substantially as set forth.

8. The combination, in a vehicle, of the axles, two parallel curved springs on opposite sides of each axle and suspended therefrom, a body resting on and connected directly to the rear inner spring, a spring-bar on each outer spring, and two body-loops extending from the end of the body to the opposite spring-bar, substantially as described.

9. The combination of the axle, a cross-head, a link, F, consisting of a perforated spool, K, and side arms, F F, formed integral therewith, hung to the cross-head E, parallel springs B B, and a detachable bolt, H, extending through the eye of each spring and through the spool K, all substantially as set forth.

10. The combination, in a vehicle, of two parallel transverse connected springs suspended from opposite sides of the front axle, fifth-wheel having its center over the forward axle, and the front end of the body carried immediately over the rear spring of the pair, and body-loops extended from the body to a spring-bar supported on the fifth-wheel over the front-spring, substantially as and for the purpose set forth.

In testimony whereof I have signed my name to this specification in the presence of two subscribing witnesses.

CYRUS W. SALADEE.

Witnesses:
J. CAMPBELL,
A. E. HANSMANN.